Sept. 30, 1958  E. E. HEWITT  2,853,974
PISTON CUSHIONING ARRANGEMENT FOR CYLINDERS
Filed Oct. 31, 1955
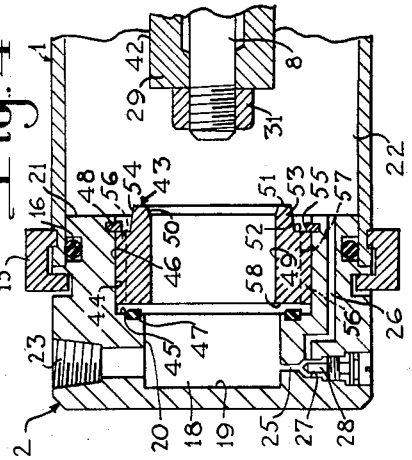
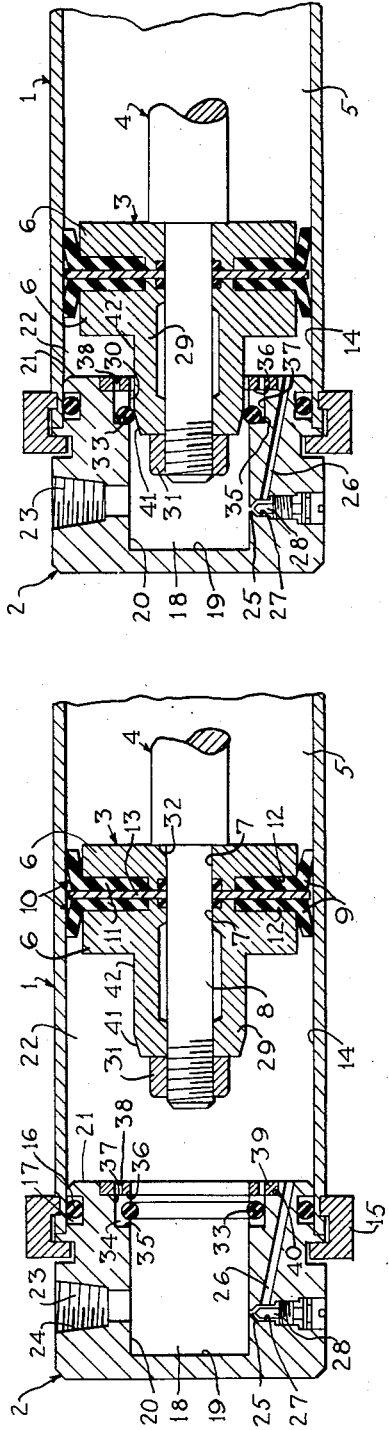
INVENTOR.
Ellis E. Hewitt
BY
ATTORNEY

United States Patent Office 2,853,974
Patented Sept. 30, 1958

2,853,974

PISTON CUSHIONING ARRANGEMENT FOR CYLINDERS

Ellis E. Hewitt, Ruffsdale, Pa., assignor to Westinghouse Air Brake Company, Wilmerding, Pa., a corporation of Pennsylvania Application October 31, 1955, Serial No. 543,695

3 Claims. (Cl. 121—38)

This invention relates to fluid pressure cushioned-piston cylinder devices, and more particularly to the means incorporated in such devices whereby the piston cushioning is attained.

The prime object of the invention is the provision in a cylinder of simplified and low cost means for effecting cushioning of the piston near the end of its stroke and providing for admission of fluid under pressure to the cylinder for effecting return stroke of the piston.

Another object is to provide a cushioned-piston cylinder which does not require close machining tolerances of telescoping parts of piston and cylinder head.

Other objects and advantages of the invention will become apparent from the following detailed description of such invention.

In the accompanying drawing,

Figs. 1, 2 and 3 are longitudinal sectional views illustrating different operational positions of a fluid pressure cylinder device embodying one form of the invention; and Fig. 4 is a fragmental view of a section of the cylinder device of the previous figures, illustrating an alternate form of the invention.

Description

Referring in general to the various figures of the drawing, for sake of illustration, the cylinder device embodying the invention may comprise a hollow cylinder 1 closed at one end by pressure head 2 and containing a reciprocable piston assemblage 3 in slidable fluid pressure sealing engagement with the inner wall of said cylinder. Removably attached to the piston assemblage 3 is the usual piston rod 4 which, in extending through such as a pressure chamber 5 and a central opening in the pressure head (not shown) at the opposite end of the cylinder 1, may serve the usual function of providing for connection of the piston assemblage with means to be actuated as well as serving as the medium through which movement of the piston assemblage may be guided to prevent its cocking during reciprocable movement within the cylinder.

Insofar as the piston assemblage acts as a means for translating a fluid pressure force into a mechanical force applied to the piston rod 4, or vice versa, and aside from the novel aspects of the invention, such assemblage may take the form in which it is shown in the drawing as comprising a pair of spaced-apart annular piston elements 6 each of which is provided with a central bore 7 to accommodate disposition of a reduced portion 8 of the piston rod 4 which extends therethrough in close fit with the walls thereof. The outer diameter of the piston elements 6 is less than the internal diameter of the hollow cylinder 1 to provide sufficient annular clearance in encirclement of said piston elements to accommodate the skirt portions 9 of the usual pair of oppositely-facing packing cups 10 which are provided to prevent leakage of fluid under pressure within the cylinder 1 past the piston assemblage. Each of the packing cups 10 is provided with the usual radial flange 11 extending inwardly from its respective skirt portion 9 and which is disposed in an annular groove 12 formed in one face of the respective piston element 6 and is clamped between such element and an intermediate back-up element 13 mounted on the reduced portion 8 of the piston rod 4. In accord with the usual practice, the outer diameter of the intermediate element 13 may be only slightly less than the inner diameter of the hollow cylinder 1 so that such element 13 may slidably engage the cylinder wall 14 of said cylinder 1 to slidably guide the piston assemblage during axialwise movement within the cylinder under circumstances where the packing cups 10 do not act in this regard.

The pressure head 2 may be secured to the cylinder by any suitable means, but in this instance is shown secured thereto by means of a clamping ring 15 locked to portions of both the cylinder 1 and said pressure head 2 and secured in place by suitable means (not shown). An O-ring gasket 16 disposed in a suitable groove in a portion of the pressure head 2 provides a static seal between said pressure head and the cylinder wall 14 to prevent leakage past said pressure head to the atmosphere.

According to structural features of the invention, the pressure head 2 is provided with a central cavity 18 defined by an end wall 19 and a cylindrical surface 20 extending from said wall into intersection with an innermost face 21 of the pressure head 2. The cylindrical cavity 18 is arranged to be coaxial with the hollow cylinder 1 and to open centrally into a pressure chamber 22 at the respective side of the piston assemblage 3. Adjacent to the end wall 19 the cylindrical cavity 18 is in constantly open communication with a fluid pressure supply and release port 23 extending radially outward therefrom to the exterior of the pressure head 2. The supply and release port 23 is adapted, by means of such as screw threads 24, to be connected to external conduit means for conveying fluid under pressure thereto and therefrom. This same end of the cylindrical cavity 18 is also constantly open to the pressure chamber 22 by way of a radial passage 25, and a passage 26 opening into the annular face 21 of the pressure head 2. Communication between the passages 25 and 26 occurs by way of needle valve chamber 27 which accommodates a needle valve 28 adjustable from the exterior of the cylinder head 2, for regulating the degree of restriction to flow of fluid under pressure imposed by such communication.

According to another structural feature of the invention, the piston assemblage 3 is provided with a cylindrical plug element 29 secured thereto by such as integral attachment with the piston element 6 at its face adjacent to the pressure head 2. The plug element 29 projects centrally from the piston assemblage 3 in the direction of the pressure head 2 in substantially coaxial alignment with the cylindrical cavity 18 therein. The outer diameter of the plug element 29 is less than the inner diameter of the cylindrical surface 20 of the cavity 18 by an amount sufficient to permit easy entrance of said plug element into said cavity during travel of the piston assemblage 3 in the direction of the pressure head 2 even during existence of a moderate degree of misalignment between the axis of the piston assemblage and the axis of said cavity, and to provide an annular fluid pressure clearance passage 30 therebetween while said plug element is disposed in said cavity, for reasons which hereinafter will become apparent, close machining tolerances for the cavity 20 and the plug 29 and exact coaxial alignment thereof are therefore not necessary. The length of the plug element 29 relative to the length of the cavity 18 is such that when said plug element is fully inserted therein same will not interfere with communication between said cavity and either the port 23 or the passage 25, as is apparent in Fig. 3. In the instance shown in the drawing, the length of the plug element 29 relative to the length of the cavity 18 is also such as will provide sufficient clearance from the end wall 19 to accommodate projection of a threaded end of the reduced portion 8 of the piston rod 4, and disposition of a nut 31 in screw-threaded attachment with said threaded portion, such nut 31 being provided to clamp the components of the piston assemblage together by forcing same into abutment with an annular shoulder 32 formed at the intersection of said reduced portion with the piston rod proper.

According to additional structural features of the invention, the pressure head 2 is provided with a sealing element in the form of an O-ring 33 of resilient material which is arranged for cooperation with the plug element 29 and the pressure head 2 to prevent flow of fluid under pressure from the pressure chamber 22 to the cylindrical cavity 18 by way of the clearance passage 30 during insertion of said plug element into said cavity, and arranged to permit subsequent flow of fluid under pressure from said cavity to said pressure chamber by way of said clearance passage for effecting a return stroke of said piston assemblage as will be described hereinafter in detail.

In this behalf, therefore, the O-ring 33 is disposed in a groove 34 extending radially outward from the cylindrical surface 20 of the cavity 18 adjacent to its plug accommodating end. The groove 34 has inner and outer spaced-apart annular side walls 35 and 36, respectively, intersecting at right angles a cylindrical surface 37 which is coaxial with the cavity 18 and forms the so-called bottom of the groove. The inner diameter of the resilient O-ring 33 when free of the plug element 29 is substantially equal to the outer diameter of said plug element, but preferably is slightly less than the outer diameter of said plug element to assure a close sliding fit between O-ring and plug element during insertion of the latter into the cavity 18. For reasons which hereinafter will become apparent, the width of the groove 34 between its walls 35 and 36 is greater than the section diameter of the O-ring 33, and the outer diameter of said O-ring when in encirclement of the plug element 29, as shown in Figs. 2 and 3, is less than the diameter of the cylindrical surface 37 to provide clearance between said O-ring and the bottom of the groove 34. Also according to the invention, there are a plurality of ports 38 extending in an axial direction through the end wall 36 adjacent to the bottom of the groove 34 to communicate same at this point with the pressure chamber 22 at the annular face 21 of the pressure head 2. Conceivably, the end wall 36 of the groove 34 may be formed as an integral portion of the pressure head 2, but according to the form in which it is shown in the drawing, such end wall 36 takes the form of a removable annular retaining element 39 disposed in a groove 40 in said pressure head 2 in encirclement of the entrance end of the cavity 18, thereby affording easy access to the O-ring 33 for removal and insertion of same. The thickness of the retaining element 39 is preferably such that when disposed in the groove 40 its surface in exposure to the pressure chamber 22 will be flush with the annular surface face 21 of the pressure head 2 to permit full travel of the piston assemblage into engagement with said surface 21.

Also, according to another structural feature of the invention, the projecting end of the plug element 29 is provided with a tapered surface 41 at its outer periphery which merges with the cylindrical surface 42 defining the major periphery of said plug element, and the diameter of said tapered surface 41 at its smaller end should be sufficiently small to permit insertion of said plug element into the O-ring 33 when resting against the lowermost portion of the groove 33 as shown in Fig. 1.

Operation of the embodiment of the invention shown in Figs. 1, 2 and 3

Referring to Fig. 1 in the drawing, assume that the piston assemblage 3 is so disposed within the cylinder 1 that the plug element 29 associated therewith is disposed outside the cylindrical cavity 18 in the pressure head 2, and that the axis of the cylinder device extends in a horizontal direction. Under such conditions the O-ring sealing element 33 will not be concentric with respect to the cylindrical cavity 18, but rather such O-ring will be resting at its bottom on the cylindrical surface 37 of the groove 34, and maximum clearance between said ring and said surface 37 will exist above said ring as viewed in the drawing.

Assume now that the piston assemblage 3 is caused to move in the direction of the pressure head 2 by pressure of fluid admitted to the pressure chamber 5, for example, and that the port 23 in pressure head 2 is vented to the atmosphere. Such movement of the piston assemblage will occur with relative freedom as the plug element 29 is advanced in the direction of the pressure head 2 and fluid, such as air, for example, in the chamber 22 is displaced by piston movement with relative ease by way of the cylindrical cavity 18 and the fluid pressure supply and release port 23. At the desired stage of piston movement the plug element 29 will enter the open end of the cylindrical cavity 18 and cause the tapered or rounded end surface 41 of said plug element to be advanced into the O-ring 33 which thereby becomes radially aligned with respect to the cylindrical surface 42 as same slides through said O-ring with continued advancement of the plug element 29 into the cavity 18. Such insertion of the plug element 29 through the O-ring 33 and into the cylindrical cavity 18 will close direct communication between the pressure chamber 22 and the cylindrical cavity 18 as the O-ring, referring to Fig. 2, is urged into sealing contact with the side wall 35 of the groove 34 and the cylindrical surface 42 of said plug element 29 by friction drag of said O-ring on the said cylindrical surface 42 advancing therethrough and by pressure of fluid compressed in chamber 22 during the piston movement. Thus it will be seen that by virtue of the sealing engagement of the O-ring 33 with the end wall 35 of the groove 34 and with the outer cylindrical surface 42 of the plug element 29, fluid under pressure built up in the chamber 22 by movement of the piston assemblage toward the pressure head 2 will be prevented from direct escape to the supply and release port 23 by way of the clearance passage 30 between the said plug element and the cylindrical surface 20 of the cavity 18. Such build-up in pressure in the chamber 22 with continued movement of the piston assemblage 3 in the direction of the pressure head 2 subsequent to attainment of sealing action between the O-ring 33 and the plug element 29 will progressively increase to oppose movement of the piston assemblage at the final stages of its stroke in the respective direction and thereby will cushion such piston assemblage as it completes such stroke and is brought into abutment with the face 21 of the pressure head 2.

At the same time, to provide a means for regulating the degree of cushioning of the piston assemblage 3 during the final stages of this stroke in the direction of the pressure head 2 and to act as a means for relieving the pressure of fluid built up in chamber 22 for cushioning purposes, fluid under pressure in the chamber 22 is permitted to escape to the vented fluid pressure supply and release port 23 at a restricted rate in bypass of clearance passage 30 by way of the passage 26, the needle valve chamber 27, the passage 25, and the cylindrical cavity 18 during the time that the plug element 29 is being advanced by piston movement into the cylindrical cavity. By manual adjustment of the needle valve 28, the degree of restriction imposed on such escape of fluid under pressure from the chamber 22 may be regulated as desired to suit various operating conditions of the cylinder device.

From the foregoing description it will be apparent that the O-ring 33 in the present arrangement provides a relatively simple means for sealing off the pressure chamber 22 from the port 23 to attain the desired build-up in pressure of fluid in said chamber 22 for cushioning purposes, while at the same time, by virtue of freedom of movement of said O-ring radialwise, close tolerances and fits, necessary for precise alignment of the piston assemblage 3 and attached plug element 29 with the respect of the cylinder 1 and cavity 18, are not necessary and therefore considerable sayings in costs of manufacture of such cylinder device may be realized.

Assume now that the piston assemblage 3 is in the position, in which it is shown in Fig. 2, in engagement with the face 21 of the pressure head 2; that the pressure chamber 5 is devoid of fluid under pressure and vented to atmosphere; that the pressure of fluid in the chamber 22 has been dissipated; that the sealing ring 33 is in abutment with the side wall 35 of the groove 34 in said pressure head 2; and, that it is desired to effect a return stroke of said piston assemblage in the opposite direction away from said pressure head. To accomplish this desire, fluid under pressure will be supplied to the port 23, and, according to a feature of the invention, such fluid under pressure will flow therefrom into the cylindrical cavity 18, thence, by way of the clearance passage 30 between the plug element 29 and the cylindrical wall 20 of said cavity, such fluid under pressure will flow to the sealing ring 33 and cause same to shift slidably on the cylindrical surface 42 of said plug element away from the wall 35 of the groove 34 to a position as shown in Fig. 3 in abutment with the opposite end wall 36 of said groove and thereby permit such fluid under pressure in the clearance passage 30 to flow radially outward between said O-ring and said end wall 35, then in an axial direction such fluid under pressure will flow through the annular clearance space between said ring 33 and the cylindrical surface 37 of the groove 34, and through the ports 38 in wall 36 to the pressure chamber 22, and in thus acting on the entire area of the piston assemblage 3, such fluid under pressure will cause same to move rapidly in the desired direction away from the pressure head 2 as the plug 29 is caused to leave the cylindrical cavity 18.

From the foregoing description it will be appreciated that I have provided a relatively simple, reliable, and inexpensive means in the form of an O-ring 33 whereby fluid under pressure may be entrapped in the pressure chamber 22 for purposes of cushioning movement of the piston assemblage 3 in the direction of the pressure head 2, and whereby fluid under pressure may subsequently be rapidly supplied to said pressure chamber 22 for effecting promptly a return stroke of said piston assemblage. The O-ring 33 thus serves the dual function of acting as a seal during insertion of the plug element 29 into the cavity 18 and as a valve which permits flow of fluid under pressure via said cavity past said O-ring for return movement of the piston assemblage.

*Description of the embodiment of the invention shown in Fig. 4*

Referring to Fig. 4, the alternate embodiment of the invention, in place of the resilient O-ring 33 of the previous form of the invention, comprises an annular metal sleeve element 43 which is slidable in an axial direction within a counterbore 44 opening inwardly from the annular face 21 of the pressure head 2 into intersection with the cavity 18 at annular shoulder 45. The counterbore 44 is coaxial with the cavity 18 and the annular shoulder 45 extends in a radialwise direction with respect to the axis of said counterbore. The diameter of the outer cylindrical surface 46 of the sleeve element 43 is only slightly less than the diameter of the cylindrical surface of the counterbore 44 to permit the sleeve element 43 to move with relative ease in an axialwise direction to opposite extreme limit positions defined in one directon by engagement with annular sealing ring 47 fixed to the pressure head 2 and projecting from the annular shoulder 45 concentrically therewith, and in the opposite direction by engagement with an annular retaining ring 48 mounted in the pressure head 2 adjacent to the end surface 21 thereof and projecting radially inward of the cylindrical surface of the counterbore 44. The inner cylindrical surface 49 of the annular metal sleeve element 43 is of substantially the same diameter as the diameter of the cylindrical surface 42 of the plug element 29, the former diameter being only slightly greater than that of the plug element 29 to facilitate advancement of said plug element into said sleeve element but with small clearance therebetween. To facilitate such insertion of the plug element, the inner surface of the sleeve element 43 may be provided with a tapered surface 50 which merges with the cylindrical surface 49. The width of the annular metal sleeve element 43 is such that when it is disposed in the counterbore 44 in engagement with the sealing element 47 its annular end surface 51 will lie in substantially the same plane as the end face 21 of the piston head 2 so as not to interfere with full travel of the piston assemblage into engagement with said end surface 21. To permit the desired axialwise movement of the sleeve element 43, its outer periphery is recessed or undercut to provide a stop shoulder 52, disposed away from the end surface 51, for engagement with the stop ring 48 which encircles the intermediate portion 53 of said sleeve element between surfaces 51 and 52. The radialwise dimensions of the intermediate portion 53 of sleeve element 43 relative to the stop ring 48 are such that clearance exists between the outer peripheral surface 54 of said portion 53 and the inner peripheral surface 55 of the stop ring 48 for reasons which hereinafter will become apparent. Disposed in the sleeve element 43 to lie outside the line of contact of sealing element 47 with said element 43, there are a plurality of circumferentially spaced-apart grooves 56 indicated by dotted lines 57 which extend in an axialwise direction between end faces 52 and 58 of said element 43, in such a manner as to be constantly open to the clearance space between its portion 53 and the stop ring 48.

*Operation of the alternate embodiment shown in Fig. 4*

Cushioning of the piston assemblage is obtained in the alternate embodiment as shown in Fig. 4 by advancement of the plug element 29 attached thereto into the sleeve element 43 which will be caused by frictional contact with the outer surface of said plug element and by pressure of fluid created in chamber 22 to shift axialwise into sealing contact with the sealing ring 47 to close off direct communication between said pressure chamber 22 and the supply and release port 23 by way of the cavity 18 and thereby cause fluid entrapped in said pressure chamber 22 to be compressed during continued movement of the piston in the direction of the pressure head 2 for cushioning such movement. At the same time, fluid under pressure is permitted to escape from said pressure chamber 22 at a restricted and controlled rate, determined by adjustment of the needle valve 28, to the atmosphere by way of the passages 25, 26, the cavity 18, and the port 23.

In effecting a return stroke of the piston assemblage 3 in the opposite direction, the pressure chamber 5 will be vented to the atmosphere and fluid under pressure will be supplied to the port 23 in the pressure head 2. Such fluid under pressure will flow from the port 23 into the cavity 18 and, via the clearance between the plug element 29 and the cylindrical surface 20 of said cavity, said fluid under pressure will flow to the end face 58 of the sleeve element 43 and cause same to shift in an axialwise direction relative to said plug element and to the pressure head away from the sealing element 47 and into engagement with the stop ring 48 to thereby uncover the respective ends of the grooves 56 to said clearance and permit fluid under pressure therefrom to flow through said grooves into the pressure chamber 22 via the interior of said stop ring. Such fluid under pressure in acting over the entire area of the piston assemblage including the portion thereof exposed to the pressure of fluid in chamber 22 and to pressure of fluid in the cavity 18 will cause rapid movement of the piston assemblage in the direction of the pressure chamber 5 as the plug element 29 is carried out of the annular metal sleeve element 43.

From the foregoing it will be apparent that the form of the invention illustrated in Fig. 4 employing the annular metal sleeve element 43 cooperable with the resilient annular sealing ring 47 affords a relatively simple arrangement for effecting the necessary closure of the pressure chamber 22 to the supply and release port 23 during movement of the piston assemblage in the direction of pressure head 2 to attain cushioning of such movement and for permitting subsequent supply of fluid under pressure from said port 23 into the pressure chamber 22 for effecting a rapid return movement of said piston assemblage away from said pressure head.

Having now described the invention, what I claim as new and desire to secure by Letters Patent, is:

1. A piston and cylinder assemblage comprising a cylinder, a piston disposed in said cylinder for reciprocation therein, a head element closing one end of said cylinder, a combination cylindrical air inlet and air exhaust cavity defined in said head element substantially concentric with said cylinder and opening centrally thereinto via which air in said cylinder displaced by said piston during initial movement toward said head element is exhausted and via which air under pressure may be admitted to said cylinder for movement of said piston away from said head element, a cylindrical element carried by said piston substantially concentric therewith and disposed to the side of said piston adjacent to said head element, said cylindrical element being of substantially lesser axial extent than the stroke of said piston and telescoping with radial clearance into said cavity as said piston approaches the end of its stroke, a resilient O-ring seal for said cavity mounted in one of said elements substantially concentric therewith for engaging the other element with a sliding seal to provide an air cushion between said piston and said head element as said piston approaches the end of its stroke, said O-ring seal having radial clearance with respect to the element on which it is mounted to enable bodily transverse movement thereof to compensate for any slight eccentricity that might exist between the telescoping cylindrical element and cavity and to provide a flow path open to said cylinder, and said O-ring seal being shiftable axially by pressure of fluid admitted to said cavity to open same to said flow path for return movement of said piston away from said head element.

2. A piston and cylinder assemblage comprising a cylinder, a piston disposed in said cylinder for reciprocation therein, a head element closing one end of said cylinder, a combination cylindrical air inlet and air exhaust cavity defined in said head element substantially concentric with said cylinder and opening centrally thereinto via which air in said cylinder displaced by said piston during its initial movement toward said element is exhausted and via which air under pressure may be admitted to said cylinder for movement of said piston away from said element, a cylindrical element carried by said piston substantially concentric therewith and disposed to the side of said piston adjacent to said head element, said cylindrical element being of substantially lesser axial extent than the stroke of said piston and telescoping with radial clearance into said cavity as said piston approaches the end of its stroke, said head element having an annular groove therein adjacent to the opening of said cavity, said annular groove being defined by spaced-apart end walls extending radially outward from the cylindrical surface of said cavity and joined by a substantially cylindrical surface constituting the bottom of said groove, a resilient O-ring seal disposed in said groove, the inner diameter of said O-ring seal being proportioned for slidable sealing engagement with the peripheral surface of said cylindrical element to trap air in said cylinder ahead of said piston during advancement of said cylindrical element into said cavity while said O-ring is urged by pressure of such entrapped air into sealing abutment with the side wall of said groove which is furthermost from said cylinder, means defining a by-pass establishing fluid pressure communication between the interior of said cylinder adjacent to said head element and said groove at a point or points situated radially outward with respect to the line of sealing abutment between said O-ring seal and said side wall, the outer diameter of said O-ring seal being less than the diameter of the cylindrical surface defining the bottom of said groove to permit radialwise adjustment of said O-ring seal relative to said pressure head and thereby compensate for any slight eccentricity that might exist between the telescoping cylindrical element and cavity, and the section diameter of said O-ring being less than the width of the groove between its side walls to permit air under pressure supplied to said cavity in encirclement of said cylindrical element to move said O-ring seal in an axial direction out of its sealing position to render said by-pass accessible thereto for admitting air under pressure into said cylinder to effect a return stroke of said piston away from said pressure head.

3. A piston and cylinder assemblage comprising a cylinder, a piston disposed in said cylinder for reciprocation therein, a head element closing one end of said cylinder and defining an end wall of a fluid pressure chamber within said cylinder at one side of said piston, a combination cylindrical air inlet and air exhaust cavity defined in said head element substantially concentric with said cylinder and opening centrally thereinto via which air in said cylinder displaced by said piston during its initial movement toward said head element is exhausted and via which air under pressure may be admitted to said cylinder for movement of said piston away from said head element, a cylindrical element carried by said piston substantially concentric therewith and disposed to the side of said piston in said pressure chamber, said cylindrical element being of substantially lesser axial extent than the stroke of said piston and telescoping with radial clearance into said cavity as said piston approaches the end of its stroke, said head element having an annual groove therein adjacent to the open end of said cavity, said annular groove being defined by spaced-apart end walls extending radially outward from the cylindrical surface of said cavity and joined by a cylindrical surface constituting the bottom of said groove, the end wall of said groove closest to said pressure chamber being provided with a plurality of ports opening from said pressure chamber into said groove adjacent to the cylindrical surface defining its bottom, a resilient O-ring seal disposed in said groove, the inner diameter of said O-ring seal being proportioned for slidable sealing engagement with the peripheral surface of said cylindrical element to entrap air in said pressure chamber during advancement of said cylindrical element into said cavity while said O-ring is urged by pressure of such entrapped air to a sealing position in abutment with the other side wall of said groove, the outer diameter of said O-ring seal being less than the diameter of said cylindrical surface defining the bottom of said groove to permit radialwise adjustment of said O-ring seal relative to said pressure head to compensate for any slight eccentricity that might exist between the telescoping cylindrical element and cavity and to provide a by-pass around said O-ring seal for communication of said cavity with said ports, and the section diameter of said O-ring seal being less than the width of said groove between its side walls to permit fluid under pressure supplied to said cavity to shift said O-ring out of its sealing position and uncover said cavity to said by-pass for admitting air under pressure to said pressure chamber to effect a return stroke of said piston.

References Cited in the file of this patent

UNITED STATES PATENTS

| | | |
|---|---|---|
| 2,404,547 | Strid | July 23, 1946 |
| 2,703,558 | Wilcox | Mar. 8, 1955 |
| 2,719,510 | Elder | Oct. 4, 1955 |

FOREIGN PATENTS

| | | |
|---|---|---|
| 623,478 | Great Britain | May 18, 1949 |